US008135053B2

(12) United States Patent
Assion et al.

(10) Patent No.: US 8,135,053 B2
(45) Date of Patent: Mar. 13, 2012

(54) LASER CRYSTAL DEVICE

(75) Inventors: Andreas Assion, Vienna (AT); Andreas Stingl, Vienna (AT); Alfred Tomasch, Vienna (AT); Christian Warmuth, Kierling (AT)

(73) Assignee: Femtolasers Produktions GmbH (AT)

( * ) Notice: Subject to any disclaimer, the term of this patent is extended or adjusted under 35 U.S.C. 154(b) by 0 days.

(21) Appl. No.: 12/867,907

(22) PCT Filed: Feb. 18, 2009

(86) PCT No.: PCT/AT2009/000060
§ 371 (c)(1),
(2), (4) Date: Aug. 17, 2010

(87) PCT Pub. No.: WO2009/105796
PCT Pub. Date: Sep. 3, 2009

(65) Prior Publication Data
US 2011/0013661 A1    Jan. 20, 2011

(30) Foreign Application Priority Data

Feb. 18, 2008 (AT) .................................. A 260/2008

(51) Int. Cl.
*H01S 3/08* (2006.01)
(52) U.S. Cl. ........................... 372/98; 372/101; 372/103
(58) Field of Classification Search ................ 372/98, 372/101, 103
See application file for complete search history.

(56) References Cited

U.S. PATENT DOCUMENTS

| 3,655,268 | A | 4/1972 | Reynolds |
| 6,002,697 | A | 12/1999 | Govorkov et al. |
| 6,625,184 | B1 | 9/2003 | Stingl et al. |
| 6,741,620 | B2 | 5/2004 | Gerstenberger et al. |

FOREIGN PATENT DOCUMENTS

| EP | 0117268 A1 | 9/1984 |
| EP | 1034584 A | 9/2000 |
| EP | 1553573 A1 | 7/2005 |
| EP | 1833127 A | 9/2007 |

(Continued)

OTHER PUBLICATIONS

International Search Report dated Jan. 11, 2010, issued in corresponding international application No. PCT/AT2009/000060.

(Continued)

*Primary Examiner* — Armando Rodriguez
(74) *Attorney, Agent, or Firm* — Ostrolenk Faber LLP

(57) ABSTRACT

The present disclosure relates to a laser crystal device (1) for short pulse lasers, comprising a container (4), the interior of which is sealed relative to the environment and which contains a technically pure atmosphere with windows (12, 13) in the side walls (12, 13) for the passage of laser radiation (16), which in operation passes through a laser crystal (6), wherein the window (12, 13) has an inclination of the Brewster angle to the beam path of the laser radiation (16) and a mounting (5) for the laser crystal (6) is provided within the container (4), the windows (12, 13) are inclined to each other by double the Brewster angle and are placed at an adequate distance from the laser crystal (6) position, with relation to the laser beam properties, wherein the beam cross section at the windows (12, 13) is sufficiently large in order to guarantee a peak intensity at the windows (12, 13) which is sufficiently reduced in relation to the peak intensity of the laser beam (16) at the laser crystal (6) for avoiding degenerative processes on the windows (12, 13).

12 Claims, 5 Drawing Sheets

FOREIGN PATENT DOCUMENTS

| | | |
|---|---|---|
| JP | 2005-172688 A | 6/2005 |
| WO | WO 99/27621 | 6/1999 |

OTHER PUBLICATIONS

Warren Grice: "laser damage to optial windows in the laser wire apparatus" HTTP://WWW.SNS.GOV/OIAGNOSTICS/OOCUMENTS/FORREVIEW/LASER/LASEROAMAGE.POF, [Online] Mar. 14, 2002, XP00255950B paragraph [0003].

Austrian Office Action dated Jan. 20, 2009, issued in corresponding Austrian priority application No. A 260/2008.

Notification of International Preliminary Report on Patentability mailed Dec. 23, 2010 in corresponding International Application No. PCT/AT2009/000060.

LASER CRYSTAL DEVICE

CROSS REFERENCE TO RELATED APPLICATIONS

The present application is a 35 U.S.C. §371 National Phase conversion of PCT/AT2009/000060, filed Feb. 18, 2009, which claims benefit of Austrian Application No. A 260/2008, filed Feb. 18, 2008, the disclosure of which is incorporated herein by reference. The PCT International Application was published in the German language.

BACKGROUND OF THE INVENTION

The invention relates to a laser crystal device for short pulse lasers, comprising a container whose interior is sealed in relation to the environment and which contains a technically pure atmosphere, and which includes windows attached on side walls for the passage of laser radiation, which passes through a laser crystal in operation, the windows being situated tilted by the Brewster's angle to the beam path of the laser radiation, and a mounting for the laser crystal being attached in the interior of the container. Such a laser crystal device is known from U.S. Pat. No. 6,002,697 A.

Furthermore, the invention relates to laser oscillators having such a laser crystal device.

Modern laser oscillators for the generation of short laser pulses have a high peak power because of the short pulse duration, notwithstanding the low average power. Thus, in the case of mode-coupled femtosecond laser oscillators, for example, having a pulse duration less than 100 fs, a degradation of the crystal surface can be the result due to the high intensity of the laser radiation, i.e., due to the high peak power, even if the fluence at the crystal surface is generally well below the destruction threshold of the crystal. Such damage of the crystal surface results in disturbances in the laser operation and in a higher absorption of the crystal and, as a consequence, in a destruction of the laser crystal.

The impairment of the crystal surface is a function of the atmosphere surrounding the crystal and the intensity of the laser radiation. In the case of a pure atmosphere and/or a low laser intensity, no degradation of the laser crystal occurs. On the other hand, it has been shown that degradation processes can occur even in clean rooms, for example, if electronic devices outgas in proximity to the laser device.

A diode-pumped laser having frequency multiplier stages is known from above-mentioned U.S. Pat. No. 6,002,697 A, nonlinear laser crystals being provided in the latter, which are situated in sealed containers in order to prevent penetration of moisture or contaminants from the outside. In particular, it is a concern here to prevent impairments of the laser crystal by absorbing and releasing moisture upon cooling and heating and it is additionally also provided for this purpose that an inert gas atmosphere or dry air is to be provided in the interior of the housing or container, or the container interior is to be evacuated. The windows for the entry or exit of the laser radiation, which are situated at the Brewster's angle to the laser radiation, are situated tilted to one another on diametrically opposing sides of the container, which is generally cuboid. The design of this laser crystal device is thus comparatively complex and voluminous. The continuous monitoring and flushing of the inert gas atmosphere in the container interior described hereafter, notwithstanding the expenditure connected thereto during operation of the associated laser apparatus, has also proven to be disadvantageous for the laser operation.

A laser crystal device for a laser amplifier is disclosed in EP 1 034 584 B, in which the laser crystal is housed in a tightly encapsulated container, having laser beam coupling windows on separate pipe sockets. The interior of the container is evacuated here and/or kept dry using a desiccant. The background of these measures is that the laser crystal is to be strongly cooled with the aid of Peltier elements, in order to achieve a high efficiency of the laser amplifier, which is assigned to the laser crystal, the baking of condensed water or ice on the crystal surface being prevented by the evacuation or drying of the container interior.

However, without such strong cooling in laser oscillators, degradation of the crystal surface can also occur if the environment of the laser crystal is not provided as a "pure" atmosphere.

Furthermore, it has been shown that the windows provided on the containers, via which the laser light reaches the crystal and is coupled out, may also be subject to a degradation, whereby the operation of the laser device to which the laser crystal belongs can also be impaired. This is significant in particular in the case of a laser amplifier, as is concerned in EP 1 034 584 B, and in which particularly high peak powers occur in comparison to a short pulse laser apparatus; accordingly, the laser beam windows situated at the Brewster's angle are externally attached on separate pipe sockets in this known laser crystal device for a laser amplifier, as noted, in order to thus achieve the greatest possible distance to the laser crystal, in the magnitude of 8 to 10 cm. A relatively large beam cross-section is thus obtained in the area of the Brewster's windows, in order to thus obtain a comparatively low peak intensity at this position. A reflection on the windows is counteracted per se by the arrangement of the windows at the Brewster's angle (which is known to be a function, inter alia, of the wavelength or frequency of the radiation).

SUMMARY OF THE INVENTION

It is now an object of the invention to design a laser crystal device of the type described at the beginning such that a simple, compact structure is made possible, possible impairments by degradation effects on the windows of the container also being avoided or minimized.

The laser crystal device according to the invention of the type specified at the beginning is characterized in that the windows are situated tilted to one another by twice the Brewster's angle and are located at a sufficiently large distance from the position of the laser crystal, with respect to the laser beam properties, upon which the beam cross-section at the windows is sufficiently large to ensure a lower peak intensity at the windows in comparison to the peak intensity of the laser radiation at the laser crystal, to prevent degeneration processes on the windows.

In the present laser crystal device, an extraordinarily simple, compact, space-saving structure results from the described configuration of the windows relative to one another, preferably in side walls adjoining one another at an angle, these side walls then being situated at twice the Brewster's angle relative to one another. It also has a space-saving effect if a flattened or rounded area (a transition chamfer) is provided at the transition from one side wall to the other.

Furthermore, the windows provided for the laser radiation (which are comprised of quartz glass, for example), are placed relative to the laser crystal so that the peak intensity of the laser radiation at the windows is significantly less than at the crystal surface, whereby degeneration processes at the windows are prevented. This reduction or minimization of the intensity of the laser radiation at the windows is achieved by a corresponding spacing of the windows from the laser crystal, the circumstance being used that the laser beam is focused on the laser crystal, i.e., it has a convergent shape, and therefore has a greater beam cross-section at a distance from the laser crystal than directly at the crystal surface. As a result of this laser beam geometry, in adaptation to the general energy or intensity of the laser beam, the laser beam therefore has a significantly lower intensity at the location of the window in comparison to the intensity of the radiation at the position of the laser crystal, so that impairment of the surface of the quartz glass of the windows is avoided. The distance of the window from the laser crystal primarily depends on the degree of focusing of the laser radiation, i.e., the greater the convergence angle, the shorter the distance can be, while in contrast the windows are to be situated relatively far away from the laser crystal if the convergence of the laser beam is rather weak. Of course, the fundamental power of the laser radiation, more precisely the particular peak power with respect to the short pulse durations, must also be considered in the selection of the distance. As an example, it can be specified here that in case of laser radiation having a wavelength of 800 mm and a pulse duration of 20 fs, one has a peak power of 1.5 MW, a distance between the laser crystal and the windows of approximately 3 mm, or 8 mm, respectively, being sufficient in the case of a convergence angle (half aperture angle) of the laser beam in the area of the laser crystal and its container of approximately 2.3°.

Upon focusing of the laser radiation in the laser crystal, an enlargement of the beam diameter at the location of the windows is achieved by the specified selection of the distance of the windows from the laser crystal. This enlargement is still stronger if the windows are situated inclined to the beam axis by the Brewster's angle. An enlargement of the area according to which the laser beam passes through the windows is additionally achieved by this inclined position, as is immediately obvious, so that the peak intensity of the laser radiation at the window is also thus decreased.

As already noted above, evacuating the interior of the container in which the laser crystal is situated, flushing it using an inert gas, or keeping it dry with the aid of a desiccant is already known. These measures are intended to minimize the moisture in the container interior. However, as has been shown, the crystal surface could be impaired very generally by greatly varying materials, gases, or particles in the environment if the laser crystal begins to fog up due to this atmosphere. In the present laser crystal device, the container interior therefore contains a technically pure atmosphere, no degradation of the laser crystal then occurring, even in the event of relatively high laser intensities. A technically pure atmosphere is to be understood to mean that no aerosols from technical or natural sources are present. It is particularly preferable here if the container is filled with noble gas or with pure air, or if it contains a gas having a high ionization potential, such as a noble gas, respectively. In the case of such a gas having high ionization potential, the intensity of the laser team is not sufficient for ionization of the molecules.

As noted, because of the high intensity of the laser light close to the laser crystal, degradation of the crystal surface and thus a reduction of the output power and instabilities occur; this degradation also results in spite of extremely careful sealing of the container, careful selection of the materials, and long heat treatment of the particular components, because gradual outgassing of residual chemical materials cannot be prevented. These materials are cracked by the intensive electrical field close to the crystal, and the particles are deposited on the crystal surface. In order to prevent this effect, the invention also proposes reducing the strength of the electrical field at the crystal, and this can be achieved according to the invention by selection of laser crystals having a greater thickness than usual. Such laser crystals having greater thickness have the result of enlarging the beam diameter at the crystal surface and stretching the pulse. In this way, the intensity of the field adjacent to the crystal is also substantially reduced, corresponding to the inverse product of the beam diameter times pulse duration. The increase of the crystal thickness also proves to be advantageous in the case of 50 fs pulses. In particular, experiments have shown that crystal thicknesses of at least 3 mm, in particular from 4 to 7 mm, preferably 4 to 6 mm, particularly preferably 5 to 6 mm, as a consequence of the significant reduction of the intensity at the crystal surface thus achieved, result in outstanding results with respect to longevity and stability.

The present laser crystal device can be used in greatly varying laser apparatuses, in particular in mode-coupled laser oscillators, preferably as short pulse laser oscillators, above all femtosecond laser oscillators.

The laser devices and/or oscillators or also amplifiers may be constructed in a typical way per se using dispersive mirrors, but may also have e.g. prisms for dispersion control.

The invention is explained in greater detail hereafter for exemplary purposes on the basis of preferred embodiments, to which it is not to be restricted, however, and with reference to the drawing. In the figures:

Figure 4:
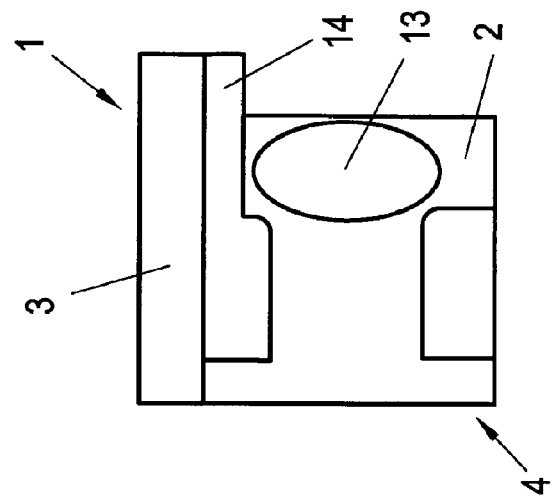
FIGS. 1 to 4 show a laser crystal device according to the invention in a frontal view (FIG. 1), a top view (FIG. 2), a side view from the right (FIG. 3), and a side view from the left (FIG. 4)
Figure 1:
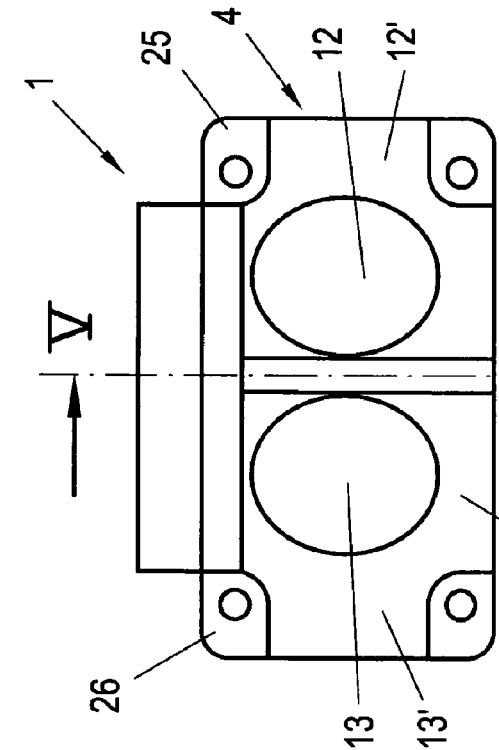
Figure 3:
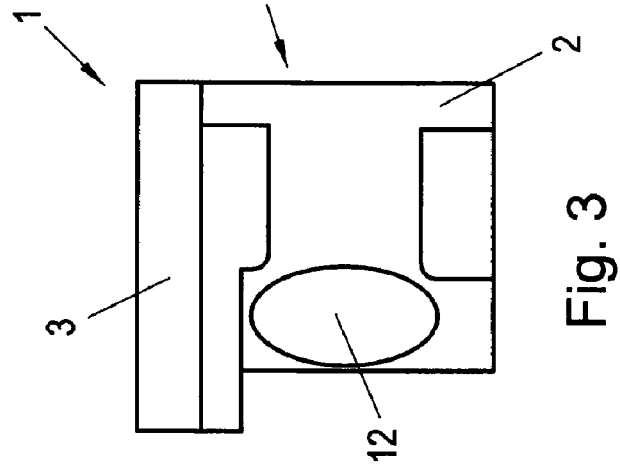
Figure 2:
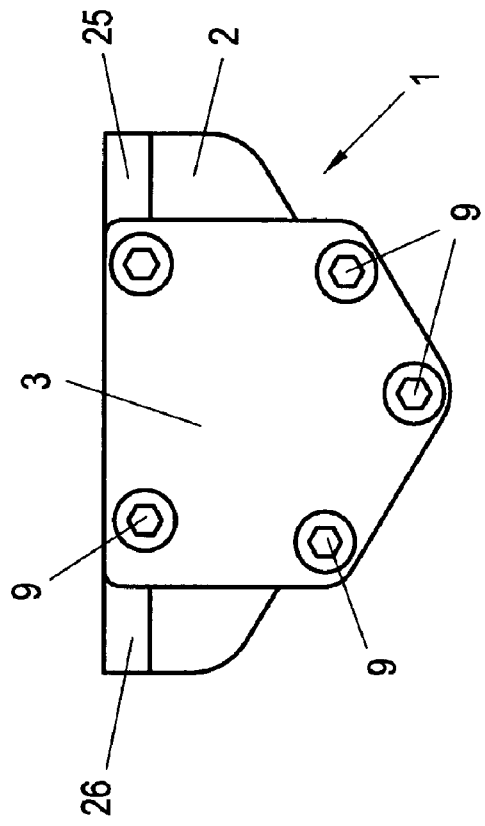
Figure 5:
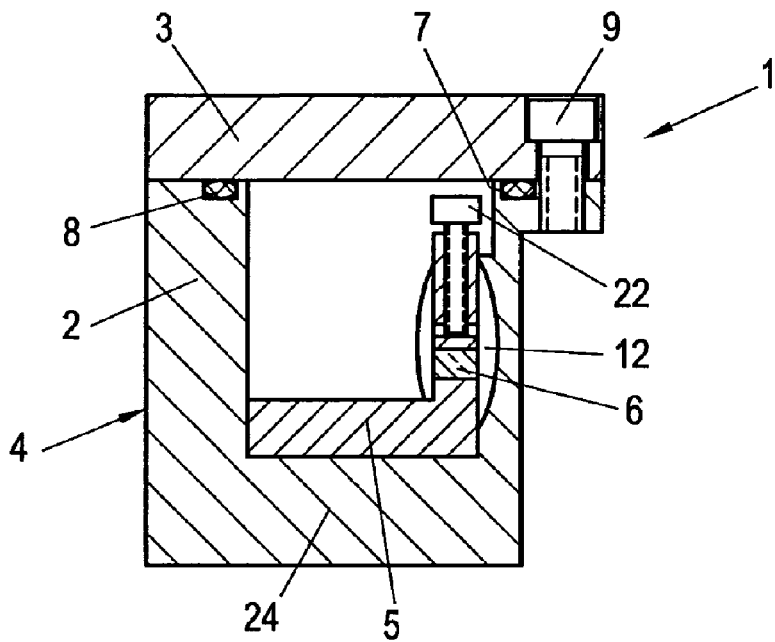
FIG. 5 shows a section through the laser crystal device according to FIGS. 1 to 4, corresponding to line V-V in FIG. 1.

DESCRIPTION OF PREFERRED
EMBODIMENTS

A laser crystal device 1 is shown in FIGS. 1 to 6, which has a housing 2 and a cover 3, which together define a container 4, and a mounting 5, which is attached in the interior of the container 4, for a laser crystal 6 as the essential components. This laser crystal 6 is, for example, a titanium: sapphire crystal, as is known per se. The housing 2 and the cover 3 comprise an aluminum-magnesium alloy, for example. A peripheral seal groove 7 for a vacuum-capable O-ring 8 (FIG. 5), for example, is provided on the upper side of the housing 2, and this O-ring 8 seals the interior of the container 4 when the cover 3 is appropriately screwed tight on the housing 2 with the aid of five cylinder head screws 9, for example, which are screwed into boreholes 10 and 11, respectively, of the cover 3 and housing 2.

The container 4, more precisely its housing 2, is further provided with two Brewster's windows 12, 13, which are situated below a flange-like fastening projection 14 of the housing 2 for the cover 3 in recesses in two side walls 12', 13' of the housing 2, which are situated at an angle to one another. The side walls 12', 13' adjoin one another in the exemplary embodiment shown via a flattened or rounded area x, as may be seen from FIG. 6 in particular. As is obvious from FIGS. 9A and 9B, the reflected laser beam can be directed just past the housing of the laser crystal device 1.

Figure 9A:
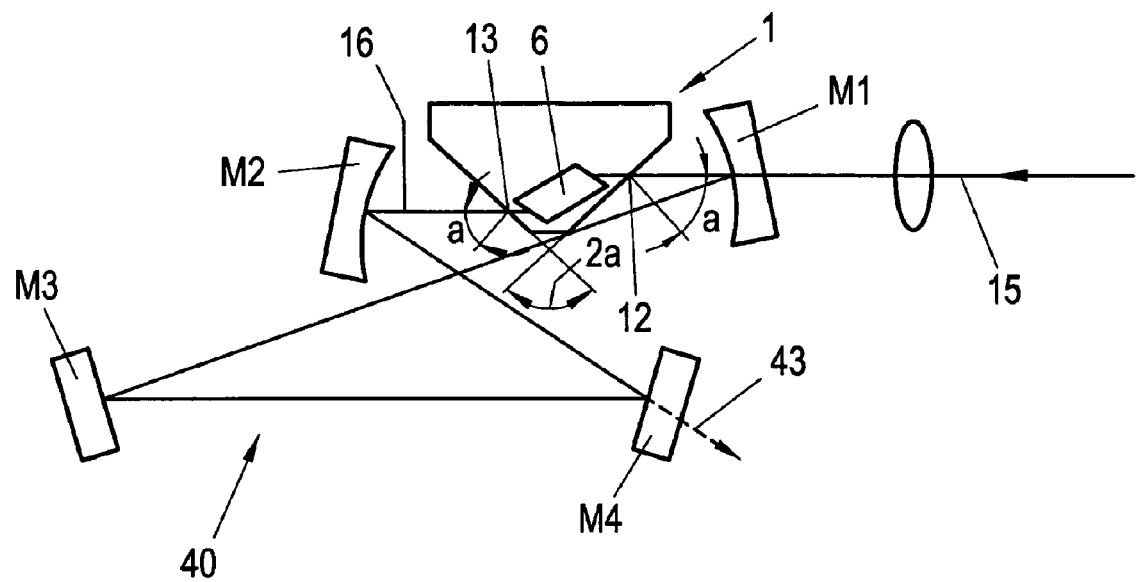
FIGS. 9A and 9B schematically show various configurations of short pulse laser resonators in which the crystal laser device according to the invention can be or is used.
Figure 9B:
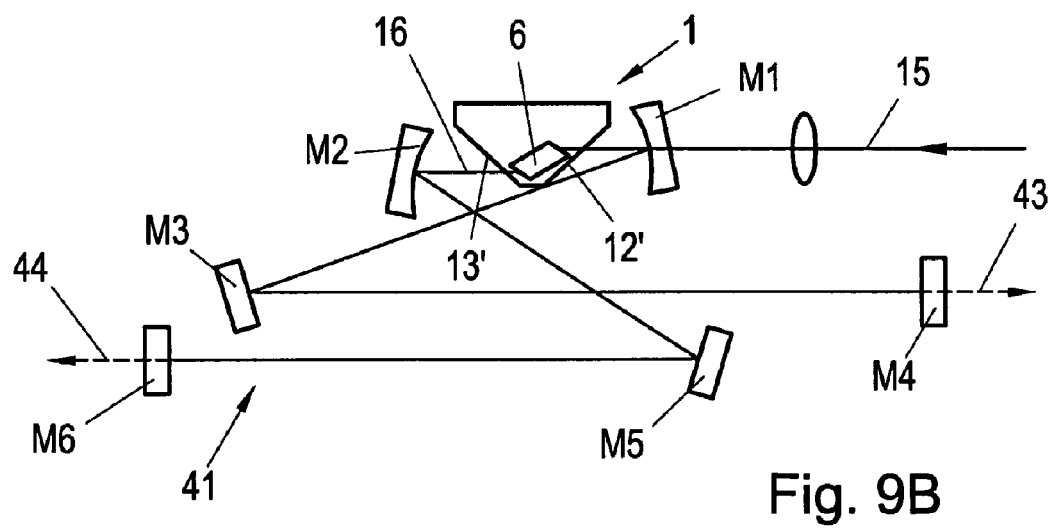

The Brewster's windows 12, 13 are glued with the aid of a vacuum-capable adhesive into the recesses provided for this purpose in the side walls 12', 13', the angle of the Brewster's windows 12, 13 being adapted for the least-possible losses, cf. also the schematic views in FIGS. 9A and 9B in this context, in which the laser crystal 6 and also a pump beam 15 and/or a laser beam 16 which is reflected multiple times in the laser resonator are schematically shown at the corresponding angle of the laser crystal 6.

The inner part of the laser crystal device 1, i.e., the mounting 5, is implemented as angular, having a bottom part 17 and a column part 18 protruding upward therefrom; the latter is rounded on its front side—corresponding to the inner side of the container 4, at the transition area between the two side walls 12', 13'—and it has cutouts 19, 20, produced by wire erosion, for example, of which the lower cutout 19 is used for receiving the laser crystal 6, while in contrast the upper cutout 20 located above it is provided for contact pressure exposure. The part 21 located therebetween is used for clamping the laser crystal 6, it being deflected slightly downward and clamped against the laser crystal 6 with the aid of a clamping screw 22, which is screwed into the column part 18 from the upper side.

The bottom part 17 has two vertical countersunk boreholes 23 in order to be able to screw down the mounting 5 in the interior of the container 4, on the bottom 24 of the housing 2 (see FIG. 5) with the aid of countersunk screws—not shown—with centering.

Figure 7:
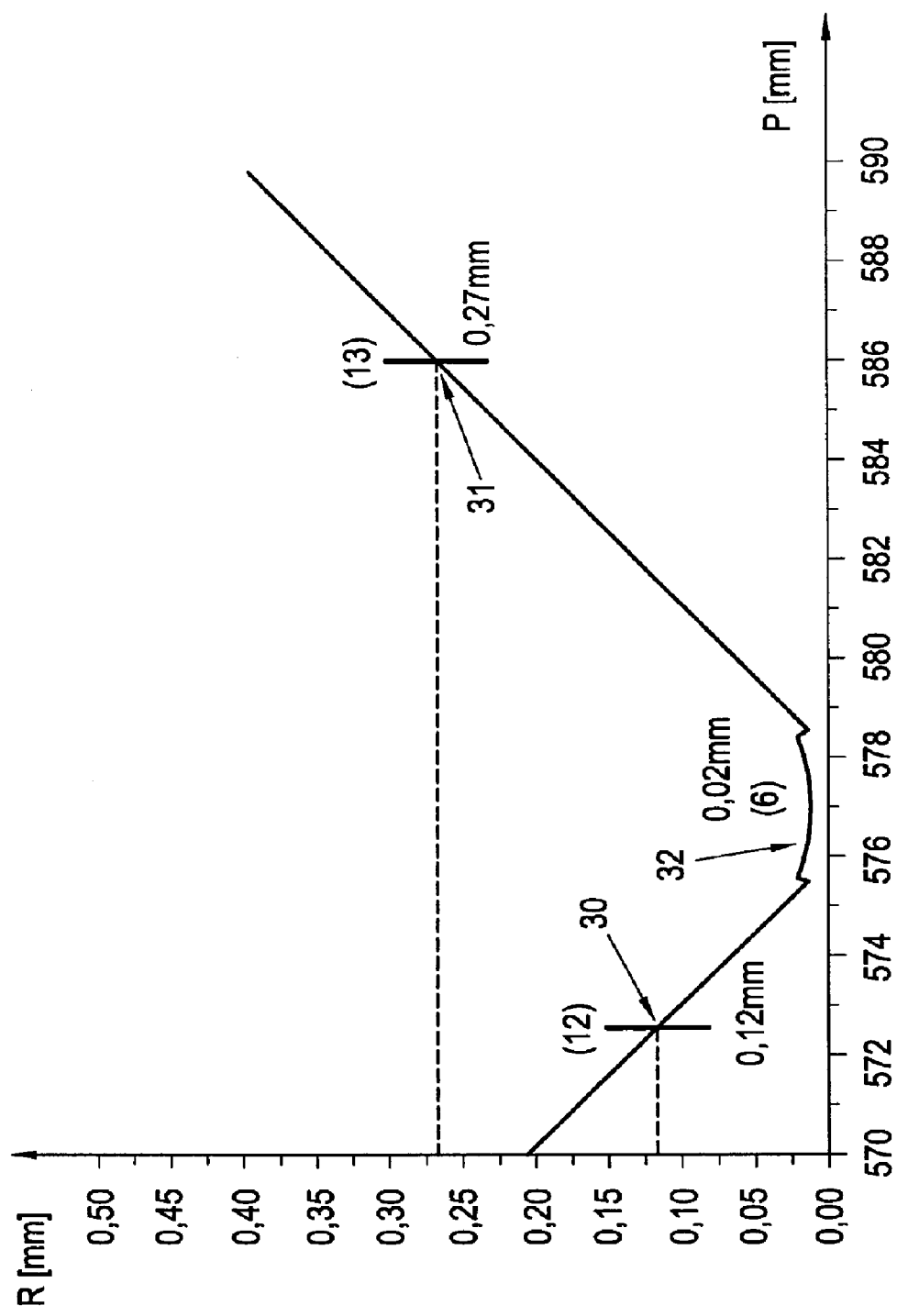
FIG. 7 shows a graph of the laser beam radius (in mm) versus the resonator position, in particular the position, or distance, respectively, measured in millimeters, within the housing of the laser crystal device.

Furthermore, the housing 2 has two lateral fastening flanges 25, 26, so that the laser crystal device 1, which thus forms a sealed crystal setting for the laser crystal 6, can be installed within the particular laser device, in a position in which a laser beam can enter through one window 12 and can exit through the other window 13, for example, as is schematically shown for exemplary purposes in FIG. 9A. The housing 2 can be produced by milling, for example; the vertical holes 23 in the mounting 5 allow centering upon attachment of the mounting 5 in the interior of the housing 2. The general cross-sectional shape of the housing 2 is pentagonal, as is obvious from the drawing, the laser crystal 6 coming to rest, after assembling, in the area of the side walls 12', 13' of the housing 2, which adjoin one another at an obtuse angle, and which also contain the windows 12, 13. However, a symmetrical configuration is not provided, rather one entry or exit surface of the laser crystal is provided closer to the adjacent window, such as 12, than the other entry or exit surface. In addition to FIGS. 9A and 9B, this also stems from in FIG. 7 in which a diagram is schematically shown, for example, which plots the curve of the radius R of the laser beam (in mm) over the longitudinal position P in the laser resonator (in mm), in particular inside the laser crystal device 1 or the container 4. The positions of the windows 12, 13 on the housing 2 are shown at 30 and 31; the radius is smallest in the area 32 of the laser crystal 6, at the crystal surface, where it is 0.02 mm. It may be read off from the x-axis that one window position 30 is placed at a distance of approximately 3 mm from the adjacent front side of the laser crystal 6, while in contrast the other window position 31 has a distance of approximately 8 mm from the laser crystal front side facing toward it.

During the assembly of the sealed laser crystal device 1, the windows 12, 13 are glued into the wall recesses of the housing 2, and the mounting 5 is screwed into the housing 2; the O-ring 8 is then laid in the groove 7 on the upper side of the housing 2, and the cover 3 is laid on the housing 2 and fixed with the aid of the cylinder head screws 9.

Thereafter, the housing 2 can be evacuated, and then filled using a gas having a high ionization potential, in particular a noble gas. However, it has been shown that a pure air filling of the container 4 is entirely adequate, if the distances of the laser crystal 6 from the windows 12, 13 are sufficiently large, as shown, in order to ensure a correspondingly large beam diameter at the windows 12, 13, see FIG. 7, so that a deposit of particles or the like on the windows 12, 13 does not result in degradation of the windows 12, 13 due to the comparatively low intensity thus provided in the area of the windows 12, 13.

Figure 8:
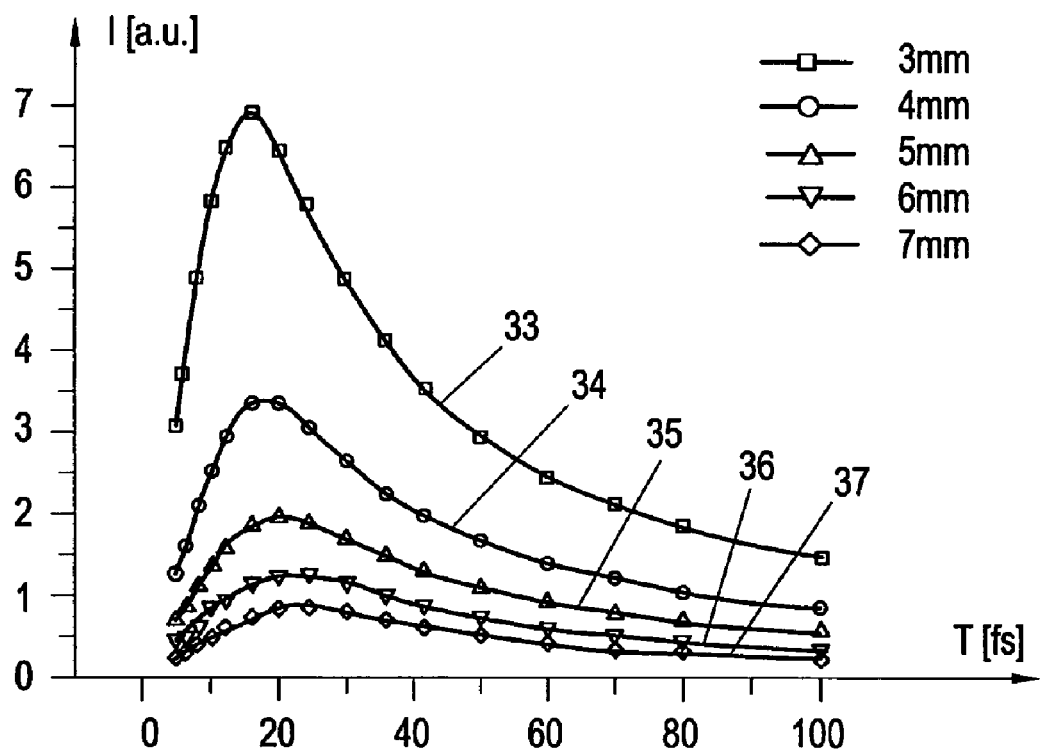
FIG. 8 shows a graph of multiple curves of values (in arbitrary units) proportional to the intensity of the laser beam versus the pulse duration, for various crystal thicknesses.
Figure 6:
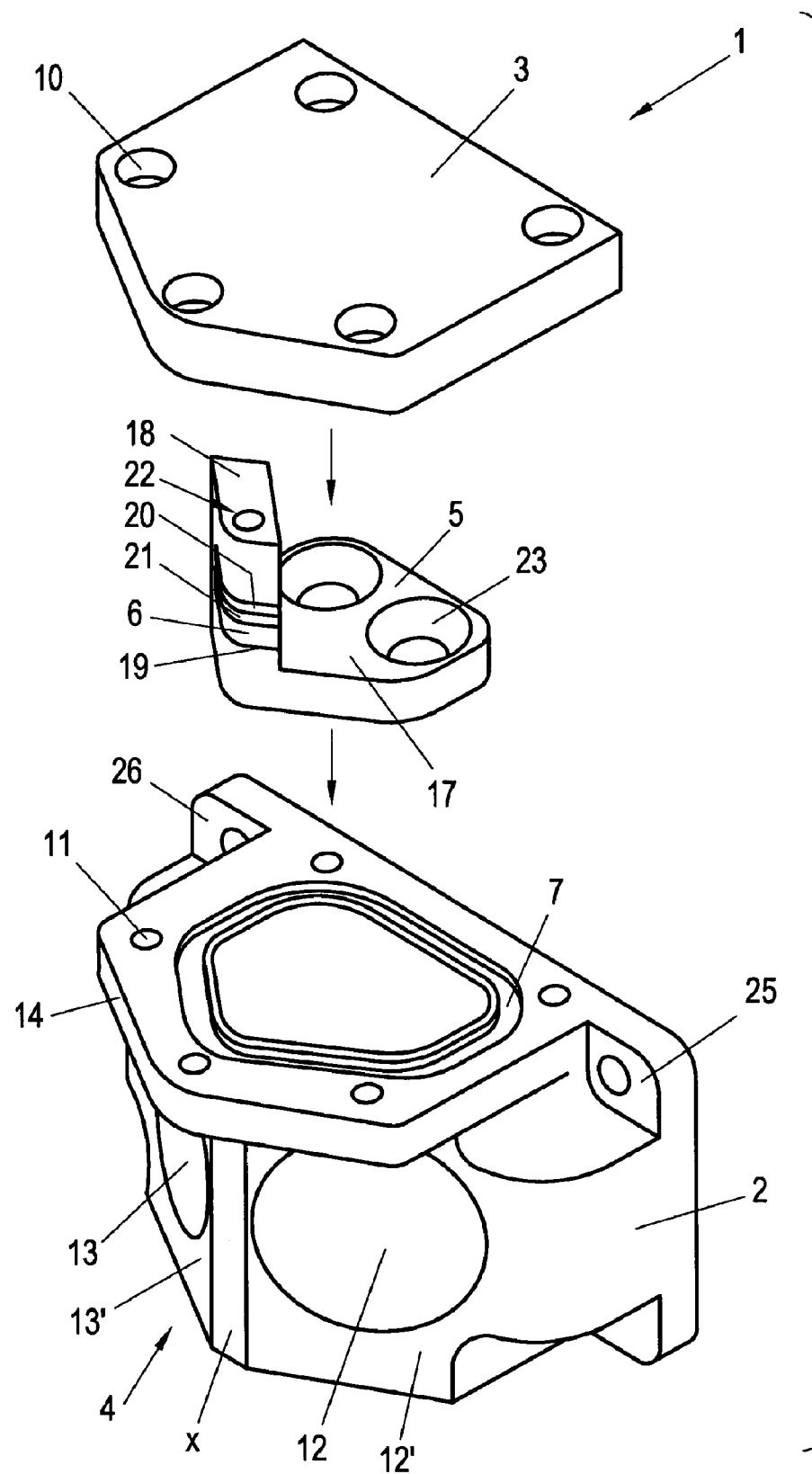
FIG. 6 shows the laser crystal device according to FIGS. 1 to 5 in a schematic exploded view of its main components.

With respect to the laser crystal 6, it can have a comparatively large thickness, preferably greater than 3 mm, in particular greater than 4 mm, depending on the pulse duration T, cf. also FIG. 8. Five curves 33 to 37 (for five different crystal thicknesses) are plotted in this FIG. 8 for an intensity value I in arbitrary units (a. u.), which is proportional to the intensity of the laser beam at the laser crystal 6, over the pulse duration T (in femtoseconds). It is obvious that at a very short pulse duration T of approximately 20 fs with a laser thickness of 3 mm (curve 33), the intensity is still comparatively great, but decreases with increasing pulse duration T. In contrast, at somewhat greater crystal thicknesses, for example, at 4 mm (curve 34) or 5 mm (curve 35), in particular 6 mm (curve 36) or 7 mm (curve 37), a lesser intensity is increasingly recognizable, in particular also already at a pulse duration T of 20 fs, at which it only still has a value in the magnitude of half of the intensity at a crystal thickness of 3 mm (curve 33). Through this reduction of the intensity of the laser beam on the crystal surface, it is also possible to prevent the harmful effects of any particles or the like which have been deposited on the crystal surface.

Finally, various laser resonator configurations are schematically shown in FIGS. 9A and 9B, which are provided for implementing mode-coupled short pulse lasers 40, 41. In each case, a pulsed laser beam is generated in an oscillator, which is formed using mirrors M1, M2, M3, M4 and optionally further M5 and M6, in a way known per se with the aid of a pump beam 15, which originates from a typical pumped laser (not shown); the mirror M1 is transparent to the pump beam 15, but not to the laser beam 16, which is reflected on its mirror surface, which is concave, for example. The mirror M4 is implemented as a partially reflective mirror, for example, in order to thus form an outcoupling mirror, at which a laser beam component 43 is outcoupled. This optionally applies similarly for the mirror M6, at which a laser beam component 44 can be outcoupled, if such a double-sided decoupling is desired, cf. FIG. 9B. Because short pulse laser devices of this type are well known per se, further explanation thereof can be dispensed with here. Furthermore, the configuration of the windows 12, 13 or of the side walls 12', 13' to the particular laser beam direction at the Brewster's angle a (which is a function of the wavelength of the laser radiation) is recognizable from FIGS. 9A and 9B, it also resulting that the two side walls 12', 13' must extend at twice the Brewster's angle $2a$ relative to one another. (The laser radiation changes neither the wavelength nor the polarization upon passage through the present laser crystal device 1.)

What is claimed is:

1. A laser crystal device for short pulse lasers, comprising a container, whose interior is sealed in relation to the environment, and which includes windows which are attached to side walls for the passage of laser radiation which passes through a laser crystal in operation, the windows being situated tilted by the Brewster's angle to the beam path of the laser radiation, and being located at a sufficiently large distance, with respect to the laser beam properties, from the position of the laser crystal at which the beam cross-section of the windows is sufficiently large in order to ensure a lower peak intensity at the windows in comparison to the peak intensity of the laser radiation at the laser crystal, to prevent degeneration processes at the windows, and a mounting for the laser crystal being attached in the interior of the container, wherein the windows are situated tilted relative to one another by twice the Brewster's angle in two side walls which are arranged at an angle to one another, of the container, and in that the container contains a technically pure atmosphere.

2. The laser crystal device according to claim 1, wherein the side walls, in which the windows are situated, adjoin one another.

3. The laser crystal device according to claim 2, wherein a flattened or rounded area is provided at the transition area from one side wall to the other.

4. The laser crystal device according to claim 1, wherein the container contains a gas having high ionization potential.

5. The laser crystal device according to claim 1, wherein the container contains a noble gas atmosphere.

6. The laser crystal device according to claim 1, wherein the container contains pure air.

7. The laser crystal device according to claim 1, wherein the windows are provided at a distance of several millimeters from the position of the laser crystal.

8. The laser crystal device according to claim 1, wherein a laser crystal having a thickness of at least approximately 3 mm is attached in the mounting.

9. The laser crystal device according to claim 7, wherein the windows are provided at a distance of at least 3 mm from the position of the laser crystal.

10. The laser crystal device according to claim 8, wherein the thickness of the laser crystal is in a range of 4 mm to 7 mm.

11. A mode-coupled short pulse laser oscillator comprising a laser crystal device for short pulse lasers, the laser crystal device including a container, whose interior is sealed in relation to the environment, and which includes windows which are attached to side walls for the passage of laser radiation which passes through a laser crystal in operation, the windows being situated tilted by the Brewster's angle to the beam path of the laser radiation, and being located at a sufficiently large distance, with respect to the laser beam properties, from the position of the laser crystal at which the beam cross-section of the windows is sufficiently large in order to ensure a lower peak intensity at the windows in comparison to the peak intensity of the laser radiation at the laser crystal, to prevent degeneration processes at the windows, and a mounting for the laser crystal being attached in the interior of the container, wherein the windows are situated tilted relative to one another by twice the Brewster's angle in two side walls which are arranged at an angle to one another, of the container, and in that the container contains a technically pure atmosphere.

12. The mode-coupled short pulse laser oscillator according to claim 11, configured as a femtosecond laser oscillator.

* * * * *